June 16, 1959     J. A. DICKIE     2,890,584
FLUID-OPERATED VIBRATION TEST EXCITER
Filed Sept. 1, 1955     6 Sheets-Sheet 1

Inventor
John A. Dickie
By his attorneys
Howson and Howson

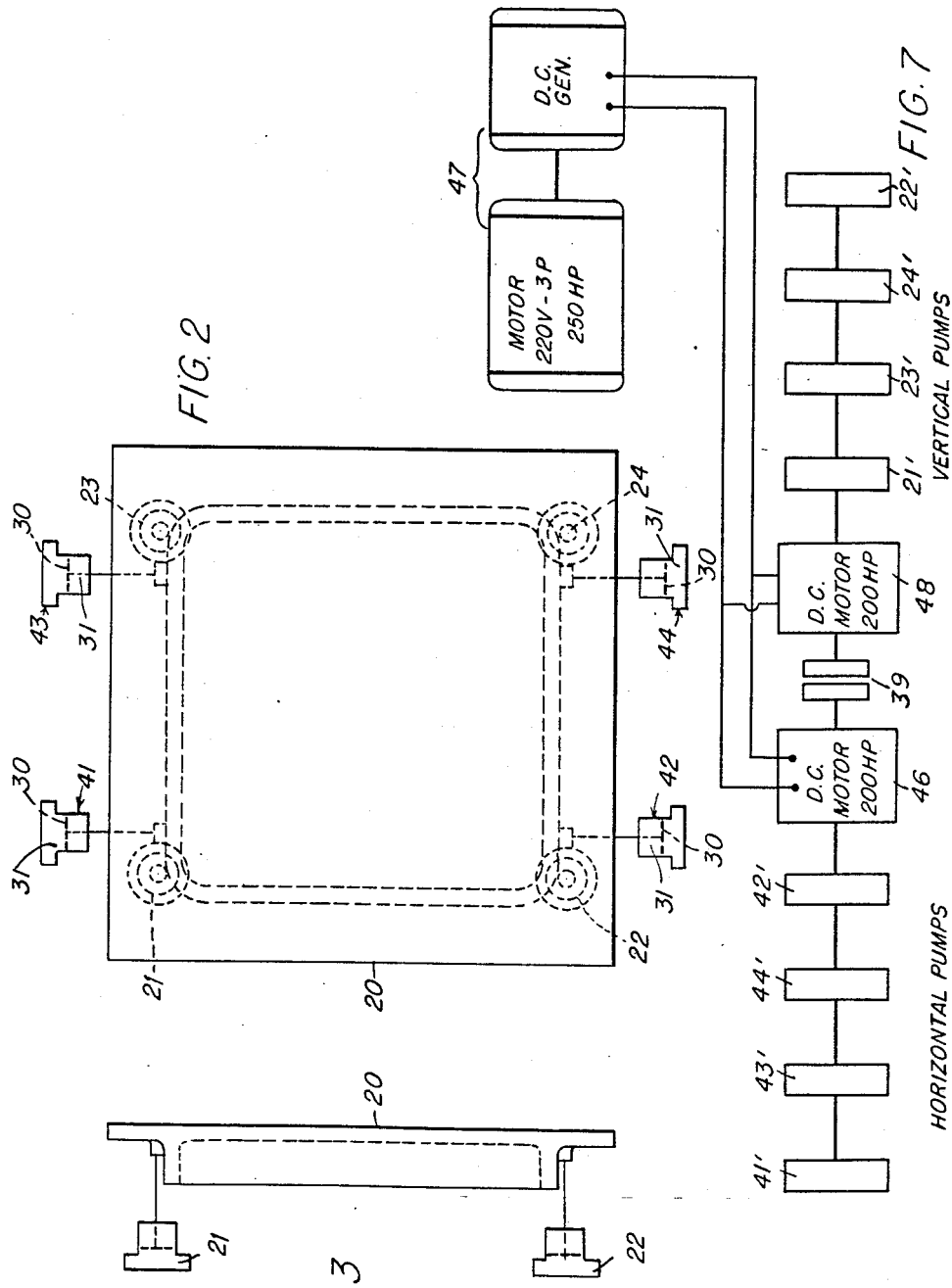

June 16, 1959  J. A. DICKIE  2,890,584
FLUID-OPERATED VIBRATION TEST EXCITER
Filed Sept. 1, 1955  6 Sheets-Sheet 3
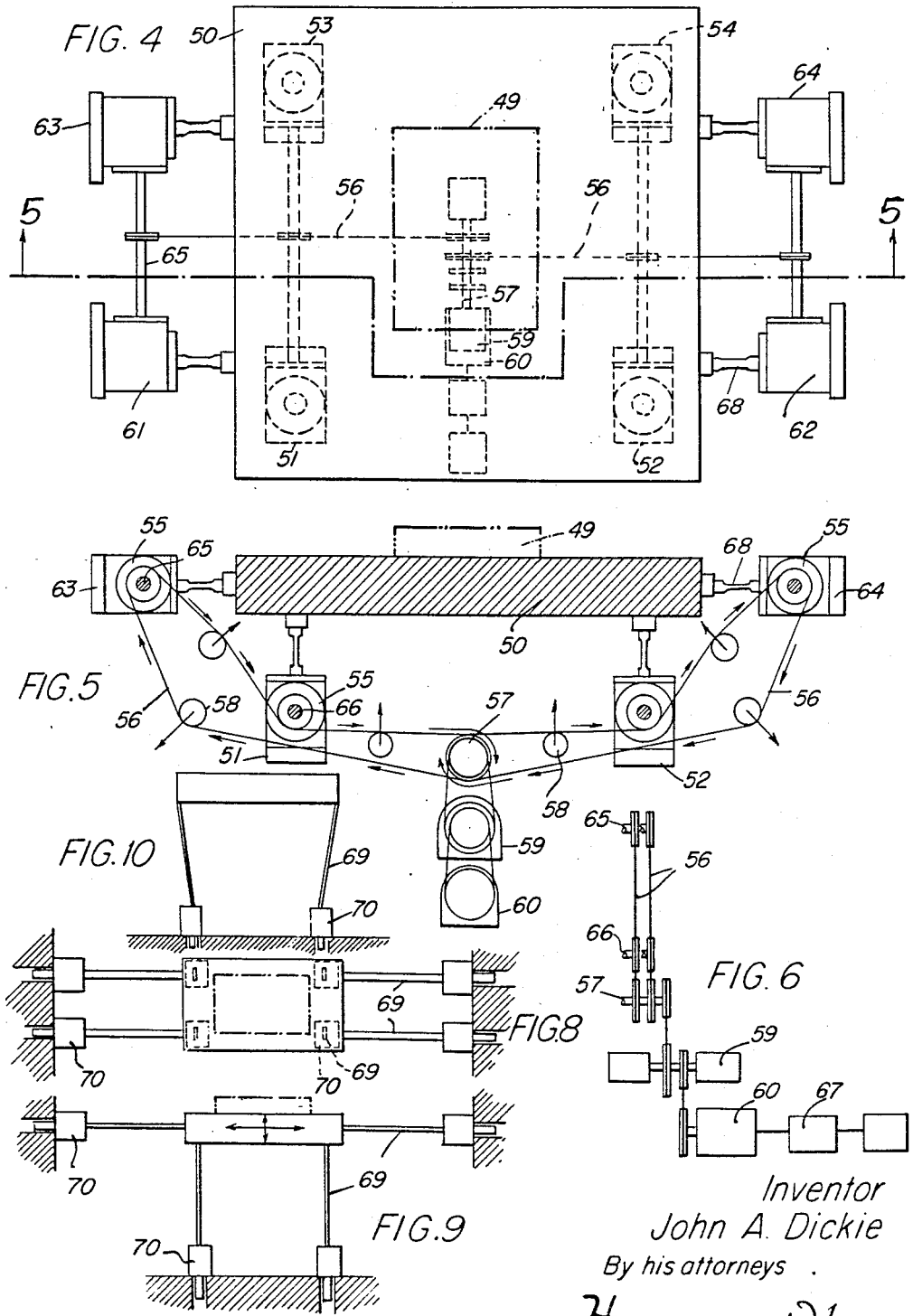
Inventor
John A. Dickie
By his attorneys
Howson and Howson

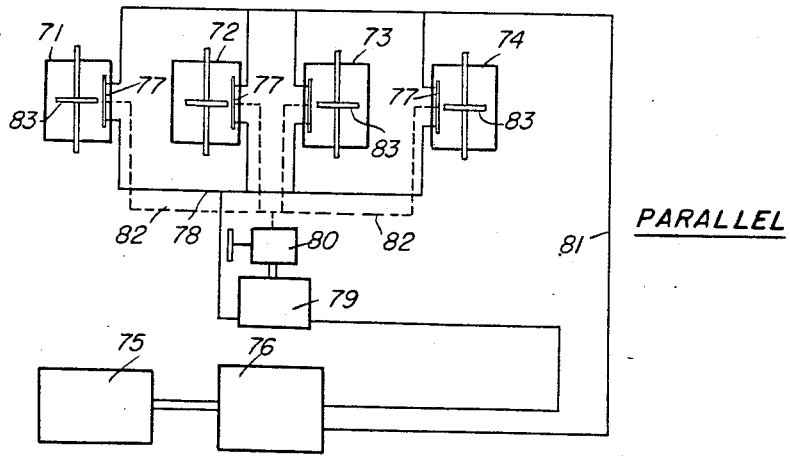
FIG. 11 PARALLEL
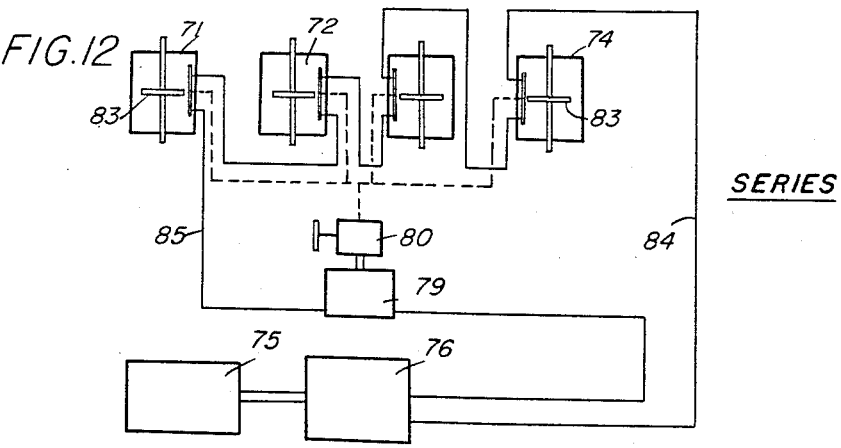
FIG. 12 SERIES
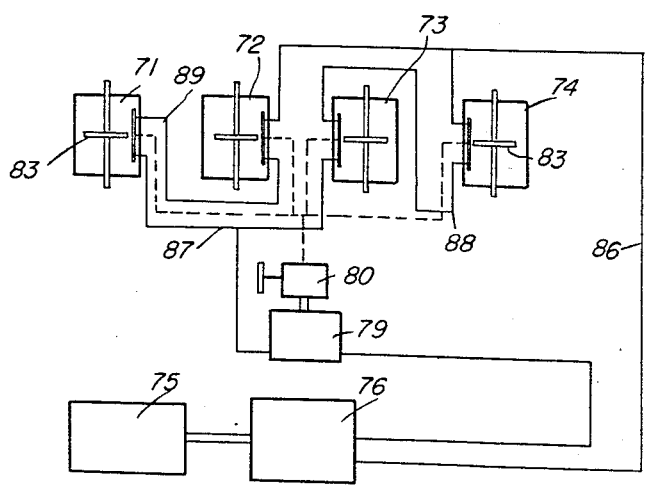
FIG. 13 SERIES-PARALLEL
Inventor
John A. Dickie
By his attorneys
Howson and Howson June 16, 1959     J. A. DICKIE     2,890,584
FLUID-OPERATED VIBRATION TEST EXCITER
Filed Sept. 1, 1955     6 Sheets-Sheet 5
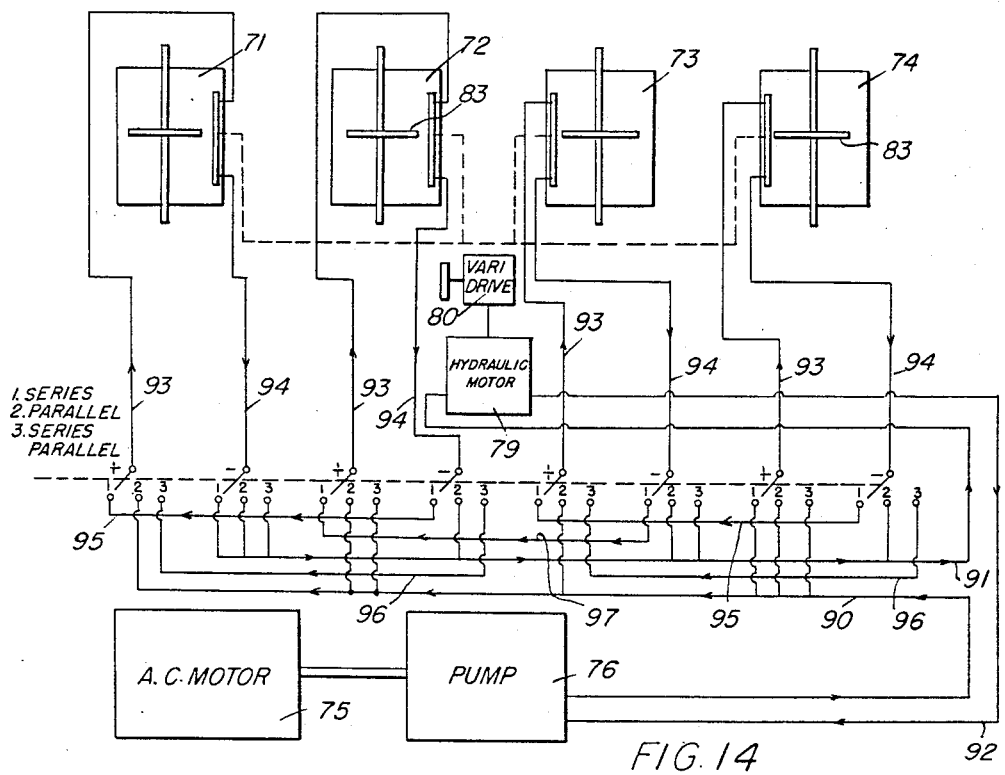
FIG. 14
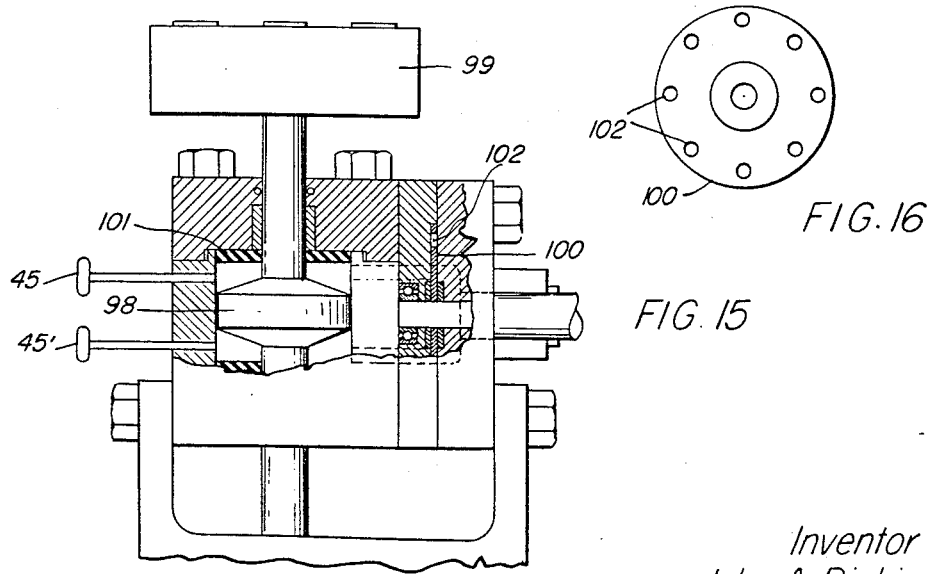
FIG. 15
FIG. 16
Inventor
John A. Dickie
By his attorneys
Howson and Howson

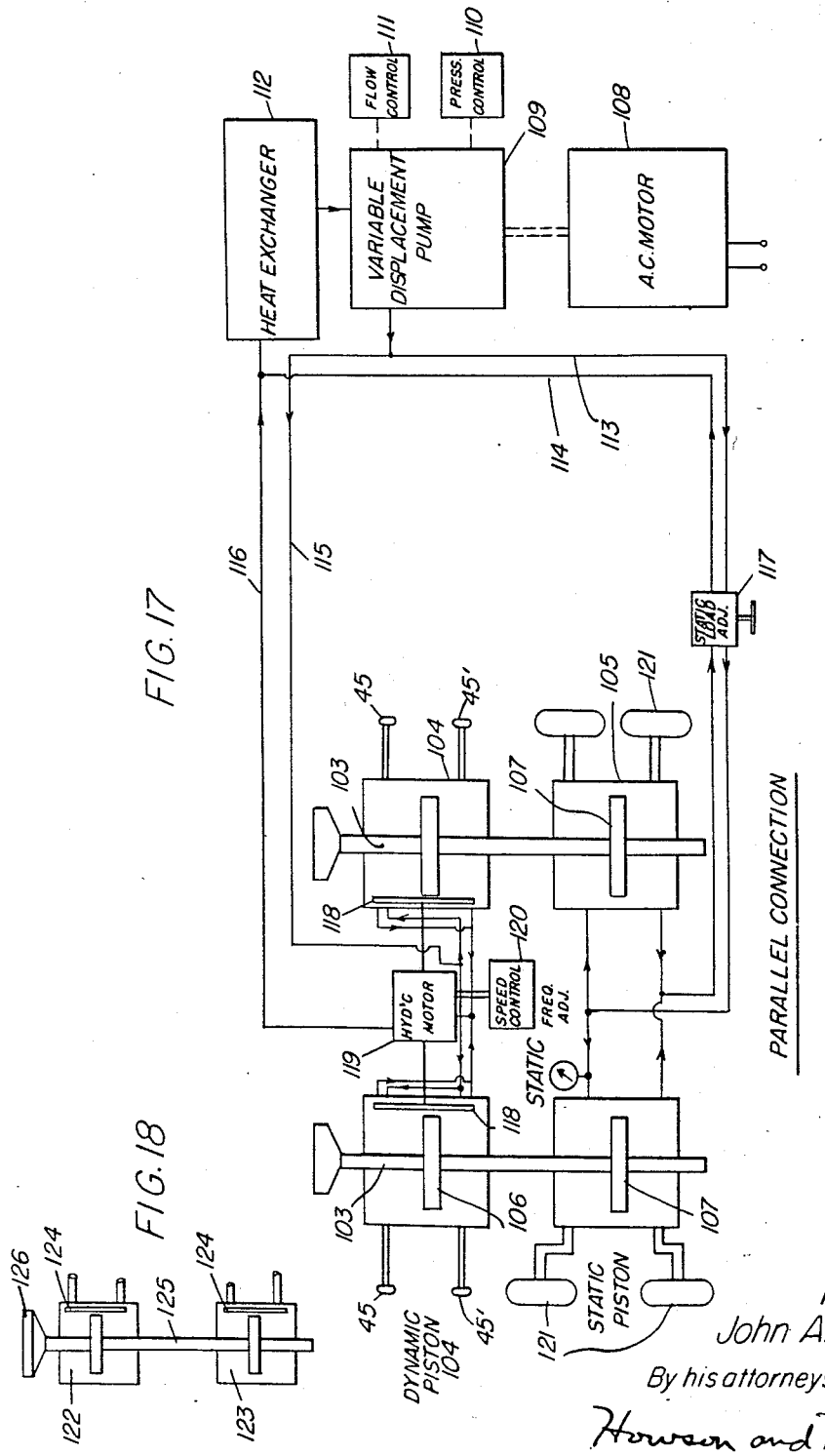

United States Patent Office 2,890,584
Patented June 16, 1959

2,890,584

FLUID-OPERATED VIBRATION TEST EXCITER

John A. Dickie, Hamden, Conn., assignor, by mesne assignments, to Textron Inc., a corporation of Rhode Island Application September 1, 1955, Serial No. 532,004

6 Claims. (Cl. 73—71.6)

This invention relates to fluid-operated vibration test exciters adapted, more particularly, to operate at high frequencies with high force generation, the fluid generally being hydraulic.

Testing of mechanical and electrical structures to destruction under static loads has become common practice in many industries to ensure that structures will take designed loads without failure. In many structures, stress concentrations may induce fatigue failure even though the static tests show the structure to be safe. Fatigue failures may also be caused by alternating loads superimposed on the static loads. Vibration testing of machines and structures to check their dynamic behavior and their resistance to fatigue therefore is also now an accepted practice. Vibration test equipment heretofore has ordinarily been driven electromagnetically or mechanically by rotating eccentric masses. Such electromagnetic machines are very suitable for testing small objects at high rates of vibration. However, the machines are relatively expensive and therefore unavailable for many uses, even where only a relatively low force is desired. In the field of high force generation, electromagnetic equipment cannot conveniently be built of sufficient size. Heretofore, fluid equipment such as hydraulic machinery has not had the simplicity or the ability necessary for this work.

In my patent application Ser. No. 444,842, filed in the U.S. Patent Office on July 21, 1954, now Patent 2,773,-482, entitled "Fluid-Operated Vibration Text Exciter," there is disclosed a machine which is simple and inexpensive and which can generate a very high force potential at relatively high frequencies. The present application is a continuation-in-part of that application.

I have invented a large machine composed of a plurality of vibration test exciters such as disclosed in my abovementioned patent application, driven from a common source and adjustably coordinated to maintain a phase relationship between the exciters adapted to give components of movement in any desired relationship. It is characteristic of the present invention that any desired motion or resolution of motions can be obtained with a common and coordinated control which is able to sweep a wide frequency range and also keep the acceleration, the displacement or the velocity constant. With this multi-exciter machine one gets tremendous force. The force is distributed over a large working area. In spite of this, the phasing of the different exciters to give any desired motion is easily obtained with my type of fluid exciter.

If desired, the exciters in this machine can be assembled to give various angular movements including circular motion, although the individual exciters each operate in a straight linear reciprocatory manner.

In the drawings,

Fig. 2 is a plan view of the table and exciter locations of the embodiment of Fig. 1.

Fig. 3 is a detail view in elevation of the table of Figs. 1 and 2, showing two of the vertical exciters attached to the table.

Fig. 4 is a plan view of an improved form of synchronized drive mechanism suitable for the machine of Figs. 1–3.

Fig. 5 is a view in side elevation of the drive mechanism of Fig. 4, taken on the line 5—5 of Fig. 4.

Fig. 6 is a view in elevation taken at right angles to the view of the drive mechanism of Figs. 4 and 5, showing only the belt and pulley connections.

Fig. 7 is a schematic view of an alternative arrangement of the pumps and motor drives for the layouts of Figs. 1–6, showing magnetic clutching means between the horizontal and vertical pumps.

Figs. 8 and 9 are a plan view and a side elevation, respectively, of another embodiment of the invention in which the table is mounted so as to make movements of relatively large amplitude.

Fig. 10 is a modification of Fig. 9 in which the flexure members are attached in a leaning manner.

Figs. 11, 12 and 13 are, respectively, diagrams of my machine with parallel, series, and series-parallel connections for driving the embodiment of Figs. 8 and 9.

Fig. 14 is a similar diagram illustrating a system of composite connections for driving the exciters of the embodiment of Figs. 8 and 9 either in series, parallel, or series-parallel, as desired.

Fig. 15 is a view in elevation, partly broken away, of the details of a single-disk exciter suitable for use in machines according to the invention.

Fig. 16 is a view of a disk with eight holes, such as can be used in the exciter of Fig. 15.

Fig. 17 is a diagrammatic view of a hydraulic vibration machine according to the invention in which there are two exciters each having static and dynamic pistons.

Fig. 18 is a diagrammatic view in elevation of a dual hydraulic vibration machine according to the invention in which two exciter heads coupled to a single table transmit two different frequencies to the one table.

Figure 1:
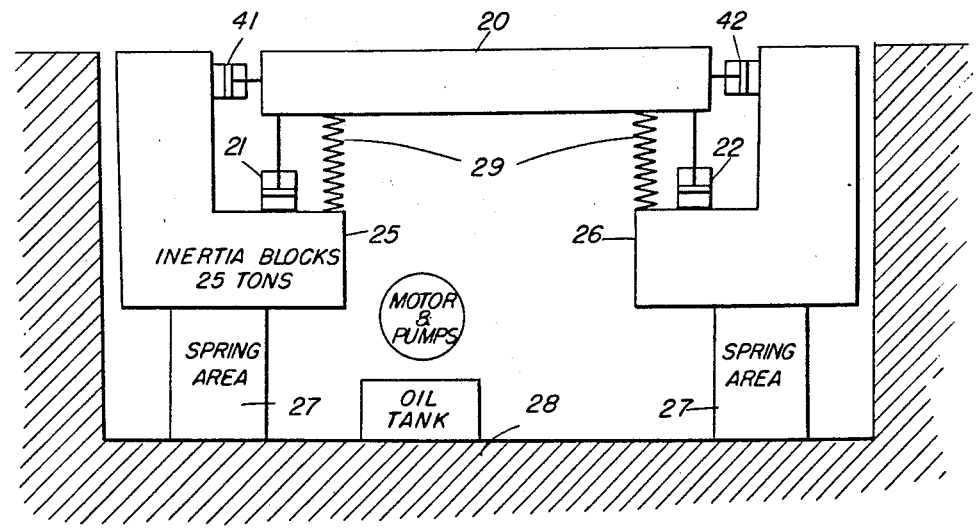
Fig. 1 is a diagrammatic view in vertical section through a hydraulic vibration test machine in accordance with the invention, mounted in a pit, showing some of the vibration exciters operating vertically and others horizontally.

Modern industry in general wishes larger and larger mechanisms vibration-tested. One example is the fatigue testing of missiles of the national defense forces. They need high force and low frequency, with or without large amplitude. Electromagnetic vibration exciters are too small for economic reasons and, furthermore, have damping which makes them unsuitable for this use. These modern uses need a large stroke compared to what the electrical machines can produce. In some cases, strokes in terms of feet are required. Furthermore, lower frequencies than the electromagnetic exciters can give are often required. The hydraulic machines have no lower limit to the frequency obtainable. Also, they are better than the mechanical machines for these low frequency jobs, because they have no flexing joints under load and therefore no friction problem. The hydraulic machine can be produced at much less cost than the electromagnetic machine.

Another important point is that the electromagnetic machines give a resonant form of vibration. Hydraulic exciters do not give the multiplication of resonance, being of the brute force type. This is the type often needed, particularly in testing large specimens.

There are certain definite uses or applications for fluid exciters which, it is found, are best served by more than one individual driving head or exciter arranged according to the present invention.

In Figs. 1–3 is shown an embodiment of the invention which illustrates some of the variety of vibrations obtainable. These figures show in a diagrammatic way how either vertical or horizontal reciprocation, or a combination thereof, can be obtained from a single machine by a unitary control and phasing with the exciters' axes at 90° relation to each other. The apparatus is shown in Fig. 1 mounted in a pit in the ground with a table 20 flush with the ground. It is supported underneath by four hydraulic exciters 21, 22, 23, 24 located near each corner of the table (see Fig. 3). These exciters are mounted on large reaction or inertia blocks 25, 26. The blocks, in turn, are supported on spring areas 27 on the floor 28 of the pit. In order that these exciters may supply only the dynamic loads, there are compression springs 29 between the reaction blocks 25, 26 and the table 20 parallel to these vertical exciters to support the static load. With this construction, the applied force has the same relationship to the load and deflection as would be anticipated under static test conditions, the exciters acting as force generators. Similar to the case in the embodiments of my above-mentioned Patent 2,733,482, each exciter has a piston 30 operating in a cylinder 31 and by alternately applying pressure to the spaces above and below the piston, the piston is reciprocated (see Fig. 2).

To cause alternate admission and withdrawal of the fluid on the two sides of each piston in the machine, I prefer to employ a perforated disk unit in accordance with my said Patent 2,773,482. A suitable unit is shown in Figs. 15 and 16 of the present application.

This is a single-disk embodiment of the individual exciter and valve disk of my said Patent 2,773,482. Exciters with two valve disks are also suitable. In these exciters there are inlet and discharge ports in the cylinder containing the piston, fluid supply inlet and discharge ports in register with the cylinder ports, and a rotary disk in direct contact with the cylinder and supply ports having holes therein to act as valve ports. By means of this arrangement, the frequency of reciprocation of the piston is controlled by the rotation of the disk. The disk in the embodiment of Figs. 1–3 is mounted on a shaft rotated from a variable speed drive. The force and corresponding motion of the table will be supplied by a hydraulic pump. The discharge pressure of the hydraulic pump is under control of the operator. A pressure relief valve in the pump surplus discharge prevents pressures in excess of that required to develop the force desired, all as hereinafter described. This valve can be adjusted to lighter table loads or lower accelerations.

As shown in Fig. 15 schematically, accumulators 45, 45' are provided to the interior of the cylinders on both sides of the pistons. The purpose of the accumulators is explained in my said Patent 2,773,482.

In addition to the vertical motion of the table obtained from the vertical exciters 21, 22, 23, 24, there are four horizontal exciters 41, 42, 43, 44, similarly driven, facing toward and connected laterally to the corners of the table in the direction shown in Fig. 2. This arrangement gives motion in two of three orthogonal directions, namely, vertically and horizontally left and right as viewed in Fig. 1. The third orthogonal direction of movement, namely, toward and away from the observer in Fig. 1, which is left and right in Fig. 2, could be obtained by other exciters if desired. It is possible to obtain rotary motion of the table 20 by using both sets of exciters. The arrangement shown will allow the operator to cover the frequency range at any desired acceleration, adjust the acceleration, switch from vertical to rotary motion, to horizontal, or to any combination of them, while the machine is running. The amplitude of the motion is controlled by adjusting the variable speed drive which also determines the frequency. Running the frequency valves faster at a given pump delivery will decrease displacement of the table. With this arrangement one can switch from vertical to horizontal movement without changing the amplitude, or switch to rotary motion at one-half the amplitude while the machine is operating. To get horizontal motion of the table, the valves for the horizontal exciters 41, 42, 43, 44 are opened and the valves for the vertical exciters 21, 22, 23, 24 are closed.

A multiplicity of exciters according to the present invention can be arranged to provide infinitely adjustable phasing of the cycle of the individual heads relatively to each other. A more highly synchronized machine in accordance with the invention is shown in Figs. 4, 5 and 6. There are four exciters 51, 52, 53, 54 vertically arranged at the corners of the table 50 on which the specimen 49 is shown by dot-and-dash lines. There also are four horizontal exciters 61, 62, 63, 64 arranged as before. Each exciter has its own rotary disk unit 55 driven by belts 56 from a common jack shaft 57 (Fig. 5). Two such belts are shown, one serving each side of the table. There are adjusting idler pulleys 58 to keep the belts tight and to adjust the various exciters to operate synchronously either in phase or 90° out of phase, or as desired. This can be done easily by moving the idlers, in or out, which sufficiently alters the angular relation of the shafts (65 and 66 for example) in the desired amounts. Thus in Fig. 6 the two top pulleys are part of the disk drives 65 for the horidontal cylinders 61 and 63 on the left side as viewed in Fig. 4, and for the horizontal cylinders 62 and 64 on the right side, respectively. The next two pulleys are for part of the disk drives 66 for the left and right side vertical cylinders 51, 53, and 52, 54, respectively. Below these pulleys is the central jack shaft 57. The latter is driven from the speed-adjusting means, i.e. variable speed drive 59, which in turn is driven by the motor 60. This motor also drives the pumps 67.

The exciters are connected to the table by flexure members 68. When the table 50 is being reciprocated vertically, the flexure members 68 of the horizontal exciters will flex as necessary. If the table is moving horizontally the flexure members of the vertical exciters will flex as necessary. When the exciters are placed at a 90° angle to each other and operated in 90° phase relationship, they can produce a rotary motion.

According to the present invention a machine constructed in accordance with the 90° arrangement just described can also be used to move the table in only one plane, for example in a horizontal plane. When the table 50 is to be moved in the horizontal plane with the load on the table, it is possible to attach the horizontal exciters or driving heads to the table by brackets extending upward to the center of gravity of the load.

In Fig. 7 there is shown an alternate form of construction to drive the pumps of Figs. 1–3 and 4–6. In this construction the horizontal pumps 41', 42', 43', 44' are mounted on the shaft of a D.C. motor 46 obtaining its current from a motor generator set 47. Also on the shaft of this D.C. motor is a magnetic clutch 39 to another D.C. motor 48 adapted to drive the vertical pumps. If both motors are to be driven, then the magnetic clutch between them can be connected. Otherwise the magnetic clutch remains disconnected. The D.C. motor 48 for the vertical pumps 21', 22', 23', 24' is driven from the same motor generator set 47 as the horizontal pumps.

In Figs. 8 and 9 are shown embodiments useful where a large table movement having components in two planes is desired. In such cases it is often desirable to avoid any extension above the plane of the top of the table. In these figures there are long flexure members 69 in place of the short members 68 of Figs. 4 and 5. They are set in vibration heads 70 at their ends removed from the table. In both cases, however, the members are axially rigid. Moreover, when a vertical exciter is shut off full of oil, the flexure member of that exciter is substantially rigid axially when the table is moving in a horizontal plane. If a very large load is placed on the table and the exciter cannot be attached to brackets which will allow the exciter force to be acting through the center of gravity of the heavy table load, then the force exerted by the exciter will not be through the center line or the center of gravity of the load, and the resulting forces acting on the table will consist of a force through the C.G. and a couple. The couple will be of such a nature as to tend to extend or stretch the left-hand flexure in Fig. 9 when the table is moving to the left, and to compress the right-hand flexure. This extension of one flexure and compression of the other will result in a rocking motion of the table as it is moved from left to right. If a perfectly horizontal motion is desired, this effect can be compensated to a large degree by arranging the vertical flexures in the fashion shown in Fig. 10. These flexures are tilted outwardly and thus are slightly opposed to each other and to the component of movement of their own exciters. As the table in this case moves to the left, the left-hand edge of the table will tend to descend and the right-hand edge will tend to rise as the table is deflected if there is a pure horizontal force applied to the C.G. of the table. However, if this system is used with a large mass on the table, as discussed previously, the couple tends to create displacements of the table exactly the opposite of those created by the flexure arrangement shown in Fig. 10. Therefore these two effects tend to cancel and the table tends to move in a more nearly horizontal fashion.

In either of the flexure arrangements shown in Figs. 9 and 10, if the table is moved to very large amplitudes it tends to move in an arc. If the horizontal motion of the table is very large and the arcuate movement is objectionable, it can be corrected by setting the flexure member as shown in Fig. 10 to compensate for couple loading, and by running the vertical exciters at twice the horizontal frequencies such a phase relationship is obtained as to lift the table at each end of its horizontal stroke. With this construction any vertical motion is limited to a very small magnitude compared to the horizontal motion.

Another use of a machine having a plurality of exciters is where there is an extremely large load, such as 20 tons, where the physical dimensions of the load are large, such as 20 feet, and frequencies above 60 cycles per second are desired. Under these conditions it is sometimes impractical to build a sufficiently rigid table because the machine should not be asked to carry the large additional dead weight of the table through the desired tests at 5 or 10 times gravity. Under these conditions the positions of the driving heads or exciters can be changed to the desired locations relative to the load, and the table completely omitted. Thus it will be seen that the machine couples exciters in any desired phase relationship and angle.

The number of exciters can be increased at will to accommodate such things as a long guided missile having five pairs of exciters set along the missile. If desired, a 5 x 4 arrangement can be provided.

It has been found that the present invention is particularly useful in situations arising in what is known as "fatigue testing." The multiplicity of heads shows great adaptability when controlled in accordance with the present invention, in testing through a range of frequencies of vibration. This will be explained in connection with Figs. 11-14. Other advantageous combinations possible with my multi-exciter machines will be described hereinafter. It is characteristic of the present machine that it has the performated disk type of control of Patent 2,773,482, above mentioned, and includes a unitary control having adjustable control of the timing of the different exciters to give the desired interrelation of movements.

Let us assume, for example, that there is a constant power supply at a rated pressure of pounds per square inch, and a rated gallons per minute. Under these conditions, if four heads or exciters are working in parallel, as shown in Fig. 11, each will develop the maximum force; and since each will receive only one-fourth of the available oil volume, the apparatus is restricted to one-fourth of its maximum velocity. This is the condition that would be required for the maximum load testing of the maximum size speciment that a given installation could handle.

A lower load which can be given the maximum number of cycles of a typical stress versus number of cycles (S-N) fatigue test curve can be run at maximum velocity. This can be done by using a single exciter or when desired for load distribution or the continuation of a test set-up where four heads are used working in parallel, by switching the four heads into series operation, as shown in Fig. 12. The four heads in series operation each handles the full volume but only has available one-fourth of the full pressure for the same load stroke relationship as would be achieved with the single exciter. Intermediate loads can be run using two exciters in parallel and two in series, as shown in Fig. 13. Under this condition the combination will develop one-half the maximum load and one-half the maximum velocity. It will be noted that when the four heads are working in parallel, each head has the same load unless throttled, while where the heads are in series each has the same displacement except when by-passed.

It must be remembered that with vibration test exciters there is always the requirement of adjusting the frequency or, in many cases, actually sweeping the frequency ranges.

In order to adjust the frequency of the vibrations or actually to sweep frequency ranges along either constant displacement, constant velocity or constant acceleration lines, the adjustable volume main pump, the adjustable volume hydraulic motor, and the variable speed device can be manipulated as follows.

Constant displacement at different frequencies is achieved by setting the volume of the hydraulic motor and the speed ratio of the variable speed drive and adjusting the delivery rate of the main pump. This adjustment of the volume of the main pump will change the volume through the driving head and the hydraulic motor, thereby changing frequency in direct proportion to volume at substantially constant stroke of the driving head.

If constant velocity of the driving head at different frequencies is desired, this can be achieved by setting the pump volume at a constant gallons per minute discharge and adjusting the variable speed unit to change the frequency. If more frequency range is desired than is avaiable with the variable speed unit, further range can be obtained by adjusting the hydraulic motor volume per revolution.

Constant acceleration of the driving head at different frequencies can be achieved by setting the pump to control pressure and relieving the discharge of the driving head at constant pressure. The hydraulic motor can then be driven with hydraulic fluid direct from the pump at controlled pressure, by-passing the hydraulic head. Under these conditions the hydraulic motor uses little volume at low speed, and since constant acceleration is being followed the power head requires little volume at high speed. Therefore this by-passing of the driving head does not unduly affect the maximum available power. Under these conditions the frequency is controlled by adjusting the amount of fluid led through the hydraulic motor.

In this invention, the valves will be driven by a hydraulic motor capable of a speed range of approximately 40 to 1. For example, the r.p.m. might run from 40 to 1600 and the motor might be of the adjustable volume type in combination with a variable speed device.

In the diagram of Fig. 11, a multiple exciter (i.e., head) hydraulic machine is shown in which the four heads 71, 72, 73, 74 are connected in parallel. Mechanical connections are shown by dash lines and hydraulic flow connections by solid lines with arrow heads. There is a constant speed A.C. motor 75 driving the main pump 76.

The liquid from the pump goes by a line 81 in parallel to the four heads 71–74 where it supplies the rotary disks 77 of the four heads and moves the pistons 83. Thus each head develops the maximum force, but since each head gets only one-fourth of the total volume of oil, it is restricted to one-fourth the maximum velocity. This is the condition for maximum load testing of a maximum size specimen that a given installation could handle. From the valve disks the fluid is collected from all four heads into a common return line 78 going back to the main pump 76. On the return line it passes through a hydraulic motor 79 which is mechanically connected to rotate the disks. The hydraulic motor preferably is of the variable volume per revolution type. The mechanical connection to the disks is through a hand-adjusted variable speed device 80 direct to each of the four disks by connections 82.

In the series connection of Fig. 12, the parallel feed line 81 is replaced by a series feed line 84 going only to the head 74, this head is connected in series with head 73, which is in turn in series with head 72, which in turn is in series with head 71. Instead of a common return line for the fluid from all four exciters, there is a series return line 85 connecting this last-mentioned head 71 with the main pump 76 via the hydraulic motor 79, as before.

In Fig. 13 there is a series-parallel feed line 86 from the main pump to the disk units of the last two heads 74 and 73, the liquid from head 74 going to head 73 in series, and the liquid from head 72 going to head 71 in series. There is a series-parallel return line 87 from the discharge sides of the disk units of the heads 73 and 71 back to the main pump 76 via the hydraulic motor 79.

The multiple head hydraulic systems of Figs. 11, 12 and 13 can be combined into one machine which can be adjusted to either series, series-parallel or parallel connections as desired. This is shown in Fig. 14, where, as before, the constant speed A.C. motor 75 drives the main pump 76 which is a constant-speed adjustable-volume pump. There is a composite feed line 90 from the main pump in parallel to the parallel connections No. 2 of the four heads 71–4, there being individual lines 93 to each of the heads from the respective contact points 2. These individual lines are connected to the intake side from respective disk units and there are individual return lines 94 from the discharge sides of the four disk units to the No. 2 discharge connections for each of the heads. As indicated diagrammatically in Fig. 14, the individual intake line can be set on its No. 1, 2 or 3 contact, according to whether the hook-up of the heads is desired in series, parallel, or series-parallel. The individual lines from the first two heads 71, 72 are connected together by a No. 1 series tie-line 95. This connects the intake for 71 with the discharge from head 72. There is another similar No. 1 tie-line 95 connecting the intake of head 73 with the discharge pipe 94 of head 74. Similarly there are No. 3 series valve tie-lines 96 connecting the intake of head 71 and discharge of head 72 via the No. 3 contacts, and another tie-line 96 connecting the No. 3 contact of the head 73 to the individual line 93, and the individual discharge lines 94 of the head 74 to this tie-line. There is a composite return line 91 connecting the feed line 90 to the hydraulic motor 79 which goes back to the pump via the hydraulic motor 79, as previously mentioned. There is a No. 1 series-parallel tie-line 97 connecting the No. 1 contact of the second head 72 with its intake 93 and the No. 1 contact of the discharge line 94 of the head 73.

It sometimes is desirable in these test exciters to have a dynamic load superimposed on a previously existing static load. This is achieved by putting a static cylinder or piston head in series with the dynamic cylinder piston head, both on the same piston rod. The static cylinder serves to put on the static load required in fatigue testing, or it can be used with the positioning arrangement referred to in my earlier Patent 2,773,482 above referred to, to hold the cylinder and load at a mean position when driving unit against a high, steady, static load such as that experienced on a centrifuge. This static head must be springy in proportion to the load and stroke of the dynamic exciter because the load and stroke of that dynamic exciter is experienced by the static load. If the static head is springy in proportion to the load and stroke of the dynamic exciter, a good mean force is obtained. Such a construction is shown in Fig. 17 with two exciters.

In this construction there are two exciters connected in parallel, each having a single piston rod 103 passing through an upper or dynamic head 104 and a lower or static head 105. There are static and dynamic pistons 106, 107 in these cylinders, respectively. All cylinders are driven from an A.C. motor 108 which operates a variable displacement pump 109 which has a pressure control 110 for adjustment of the force and a flow control 111 for adjustment of the velocity, if desired. A heat exchanger 112 can be connected between the variable displacement pump and the delivery and return lines 113, 114, and 115, 116, respectively, for the static and dynamic pistons. These delivery and return lines connect the two static pistons in parallel and the dynamic pistons in parallel, as shown. A static load adjustment 117 can be provided in the delivery and return lines 113, 114 for the static pistons. In the delivery and return lines 115, 116 for the dynamic pistons, since means must be provided to drive the rotary disks 118, a hydraulic motor 119 with a speed control 120 is provided, the latter adjusting the frequency. If the static head merely was filled solidly with oil and directly coupled to the dynamic piston, it would be impossible for the dynamic piston to force any motion because the oil in the static piston is non-compressible. In order to introduce some elasticity into the static pistons, hydraulic fluid conventional type accumulators 121 are shown attached to both ends of the static piston. These accumulators are essentially nitrogen-filled or are some other type of gaseous-filled members which allow the oil in the static piston to flow in and out of the accumulator when the dynamic piston forces motion of the static piston. A conventional spring connecting the static piston to the dynamic could be used instead of the accumulators as an alternate means of getting elasticity. While it will be understood that a static load can be superposed on the dynamic load by running a higher pressure to one end of the cylinder than to another, it appears to be more economical to put a static head in series with a dynamic cylinder or driving head, as just described.

The other application of the invention as applied to two pistons on a single piston rod is shown in Fig. 18. This shows means which allow the table to be driven at two frequencies simultaneously, each of which can be controlled in both force and frequency. One such instance in which this combination is desired is in sloshing gasoline tanks. In such a use a high stroke is desired at low frequency simultaneously with a vibratory force and a much higher frequency. For example, a sloshing frequency of 16½ cycles per minute is sometimes needed while vibrating at 30 to 300 cycles per second. Such a device will consist of two of the previously defined hydraulic exciter heads 122 and 123, each of them having a single valve disk 124 on the side of the hydraulic exciter, and both of them driven from independent frequency drive sources (not shown). In other words, the valve disk of each of the exciters will have an independent power-driving source which can be controlled as far as frequency or speed of rotation of the valve is concerned, independent of the other one. In this manner the frequency of vibratory force introduced into exciter head 122 can be of a different frequency than the vibratory force introduced into exciter head 123. In addition, the hydraulic oil supply for exciter 122 can be at a different pressure from that for exciter 123. In this fashion the magnitude of force generated by exciter 122 and exciter 123 can be controlled independently.

The construction can be such that the two standard exciters will be coupled mechanically directly together at the point where the outward piston shaft is located. In other words, the end or protruding shaft of lower exciter 123 will have its normal table removed and it will be connected to the piston rod 125 of upper exciter 122. The combination of two exciters will then have a single table 126 or, if desired, a table can also be mounted at the opposite end of the lower exciter 123. The pistons of the two exciters will then be mechanically connected so that they will be forced to move in unison. By varying the speed of rotation of the valves of the two exciters independently and by varying the pressure of the hydraulic oil supply to the two exciters independently, it will be possible to obtain both variable or different frequency operation from the two exciters and also variable or different amplitudes at the two frequencies.

Accumulators such as those used in the dynamic pistons of Fig. 17 can also be used in Fig. 18 in both heads, if desired.

What is claimed is:

1. A vibration test machine comprising a test table, first exciter means comprising two or more hydraulic test exciters each having a piston, said pistons being attached to the table at separated points but with their axes parallel to reciprocate the table with components of movement in a first direction which is in the plane of the table, in combination with a second exciter means comprising two or more other exciters, each having a piston with its axis orthogonal to said first direction and with its pistons also attached to the table at separated points to reciprocate the table with components of movement in a second direction orthogonal to the first, said exciter means providing a support for the table, individual valve means connected to each exciter means controlling the supply of hydraulic fluid to the pistons for controlling the reciprocation of each exciter means, and a common drive for all the valve means adapted to operate the valve means of all said exciter means, and means to adjust the phase relation of the valve means of one of said exciter means in relation to the valve means of the other said exciter means, whereby the components of movement in the two orthogonal directions can be applied to the table in any desired combination.

2. A vibration test machine according to claim 1 in which there is a flexure mounting member attaching each exciter to the test table, which members are each rigid in the direction of the component of movement adapted to be given the table by its exciter but flexible in the direction of the component of movement of the exciters attached to give the component in the other direction.

3. A vibration test machine according to claim 2 in which the exciters of the first and second exciter means apply a vertical component of movement and a horizontal component of movement respectively, and the flexure mounting members of the exciters for one component of movement are attached at slightly opposed angles to each other and to the component of movement of their own exciters in order to compensate for deflections of movement under load in the direction of the other component of movement due to tipping of the flexure members.

4. A vibration test machine constructed according to claim 1 in which the exciters for one direction of movement are operated with a given amplitude and frequency while the other exciters are operated at a lower amplitude and twice said frequency in order to compensate for a rocking tendency of the table under load.

5. A vibration test machine constructed according to claim 3 in which the exciters for one direction of movement whose flexure members are attached at said opposed angles are operated at a given amplitude and frequency while the other exciters are operated with a lower amplitude and twice said frequency in order to compensate for a rocking tendency of the table under load.

6. A vibration test machine according to claim 1 having at least four exciters adapted to cause horizontal components and at least four exciters for causing vertical components of movement of the table, in combination with pump means, hydraulic connections between said pump means and the exciters, switching means adapted to connect hydraulically the exciters for one component in parallel, series-parallel or series, whereby the full range of frequencies can be swept in fatigue-testing a heavy specimen.

References Cited in the file of this patent

UNITED STATES PATENTS

| | | |
|---|---|---|
| 991,381 | Simmers | May 2, 1911 |
| 1,881,332 | Sonntag | Oct. 4, 1932 |
| 2,438,755 | Larsen | Mar. 30, 1948 |
| 2,512,304 | Calver | June 20, 1950 |
| 2,703,490 | Brueggeman et al. | Mar. 8, 1955 |